US005522992A

United States Patent [19]
Cervantes

[11] Patent Number: 5,522,992
[45] Date of Patent: Jun. 4, 1996

[54] SOLUTION TREATMENT DEVICE

[76] Inventor: Raul P. Cervantes, 1442 Goddard Ave., Louisville, Ky. 40204

[21] Appl. No.: 360,464

[22] Filed: Mar. 13, 1995

Related U.S. Application Data

[63] Continuation-in-part of Ser. No. 42,157, Apr. 2, 1993, abandoned, which is a continuation-in-part of Ser. No. 732,060, Jul. 18, 1991, abandoned.

[51] Int. Cl.$^6$ .................................................. C02F 1/00
[52] U.S. Cl. ................... 210/542; 204/155; 204/DIG. 5; 204/660; 204/668; 210/222; 210/695; 210/600; 422/7
[58] Field of Search .................................. 204/147, 148, 204/196, 197, 155, DIG. 5; 210/222, 223, 695, 542

[56] References Cited

U.S. PATENT DOCUMENTS

| | | | |
|---|---|---|---|
| 943,686 | 12/1909 | Kruse | 220/601 |
| 2,156,237 | 4/1939 | Draper | 220/601 |
| 3,767,571 | 10/1973 | Lorenc et al. | 210/695 |
| 4,133,737 | 1/1979 | Trimble | 204/197 |
| 4,169,028 | 9/1979 | Yokoyama et al. | 204/147 |
| 4,201,637 | 5/1980 | Peterson et al. | 204/148 |
| 4,264,462 | 4/1981 | Buxbaum et al. | 252/62.53 |
| 4,309,290 | 1/1982 | Heitkamp | 210/222 |
| 4,882,064 | 11/1989 | Dixon et al. | 210/695 |

*Primary Examiner*—T. Tung
*Attorney, Agent, or Firm*—Middleton & Reutlinger; Charles G. Lamb

[57] ABSTRACT

A device for the treatment of selected solutions wherein the device is a sealed container including a chemical mixture therein, at least one of the ingredients being magnetite.

18 Claims, 2 Drawing Sheets

5,522,992

SOLUTION TREATMENT DEVICE

CROSS REFERENCE TO RELATED APPLICATION

This is a continuation-in-part patent application of Ser. No. 08/042,157 filed Apr. 2, 1993, abandoned, which is a continuation-in-part patent application of Ser. No. 07/732,060 filed Jul. 18, 1991, now abandoned.

BACKGROUND OF THE INVENTION

This invention relates to a device which prevents corrosion, the formation of scale, and dislodges existing scale in a water system. Furthermore, the present invention relates to a water treatment device or "cell" for treatment of water or water-based solutions to prevent corrosion in water treatment equipment, such as, heat exchangers, cooling towers, municipal or household water systems. Even further, the present invention relates to the treatment of other chemical solutions to alter the break-down or reactions occurring therein.

In the treatment of water for use in cooling towers, heat exchangers and power generation, the water used in these systems generally comes from canals, rivers, lakes, wells and the like. Such water usually contains relatively high amounts of compounds which include the elements calcium, carbon, sulphur, magnesium, and silicon, as well as bicarbonates which stick or adhere to the walls of the tubes in the heat exchangers or the water cooling towers as well as the pipes or conduits in the equipment through which the water is being transported. Moreover, corrosion of this equipment is also prevalent. The build up of these minerals and their salts accumulate to form scale deposits; thereby, resulting in diminished heat transfer, an increase in the consumption of energy, and a decrease in the working life of the parts to which this mineral containing water is in contact. Furthermore, in the use of water from these streams, lakes, canals and the like without treatment, algae, slime, microorganisms, etc. multiply rapidly and produce masses of these organic living cells which also reduce the transfer of heat as they attack the surfaces of heat exchange tubes and the other parts of the water systems and form deposits thereon.

In most systems water treatment chemicals (water softeners) are added directly into the water supply prior to use to precipitate out many of these aforementioned metallic compounds including the salts, as well as the organic microorganisms that are free to develop. In the use of these chemicals to treat these water systems, the economics are generally quite high, chemicals are constantly being purchased and furthermore the precipitates which occur from the water treatment process also have to be frequently removed. One process for treating water including significant calcium and magnesium concentrations is described in U.S. Pat. No. 4,882,064. In this particular reference, water is contacted with a coagulant/absorbent which comprises a finely divided particulate mineral material, particularly magnetite, which reacts with the calcium and magnesium compounds in the water, the resulting reaction mix being subjected to a filtration or decantation process.

One way for the metal in the transfer system such as an iron pipeline to be protected is for the metal to be in contact with a more active electron donor. An example would be to coat the iron with another metal that will preferentially corrode, thereby saving the iron. Such protection is often referred to as providing a "sacrificial anode". Another method of protecting metal is to paint the metal with a non-conducting organic paint to keep the hydrogen ions and oxygen from touching the metal, thereby preventing the reduction reaction from occurring.

Moreover, there have been physical processes or methods for treating water to replace the chemical treatment of water and at least one such process is known and has limited success. This physical process includes the insertion of a sealed brass container which includes a number of elements therein, particularly zinc, magnesium, iron, silver, copper, potassium and magnesium, which has found limited success in the prevention of scale build-up in water systems.

SUMMARY OF THE INVENTION

It is an object of the present invention to provide a means for treating water to prevent corrosion for use in cooling towers and other heat exchange means. It is another object of the present invention to provide a water treatment means which does not include the direct contact of the water to be treated with chemicals. It is another object of the present invention to provide a water treatment means to prevent new scaling and dislodge existing scale on the walls on equipment used in a water system. It is also an object of the present invention to provide a treatment device for water-based solutions, such as wine, milk, and the like, as well as non-aqueous solutions to remove selected impurities therefrom, such as sulfites, and the like or to retard spoilage.

The present invention provides a device for treating solutions comprising a sealed container including a mixture of magnetite, a weak acid, and an inert filler. In use the container is suspended completely submerged in the solution to be treated for a preselected length of time.

DETAILED DESCRIPTION OF THE PREFERRED EMBODIMENT

In the figures, a treatment device 12 for treating solutions is shown. This treatment device includes a cylindrically shaped, sealed container 14 generally made of brass, aluminum, copper, zinc, silver, manganse, iron, tin, or combinations or alloys thereof. Also, container 14 may be coated completely or partially with a second material such as silver, gold, palladium, platinum and the like. Container 14 includes a chemical mixture 16 therein, wherein the primary ingredients are magnetite ($Fe_3O_4$ or $FeO.Fe_2O_3$) discussed hereafter, ground into a fine powder, and a weak organic acid, and an inert filler.

Figure 1:
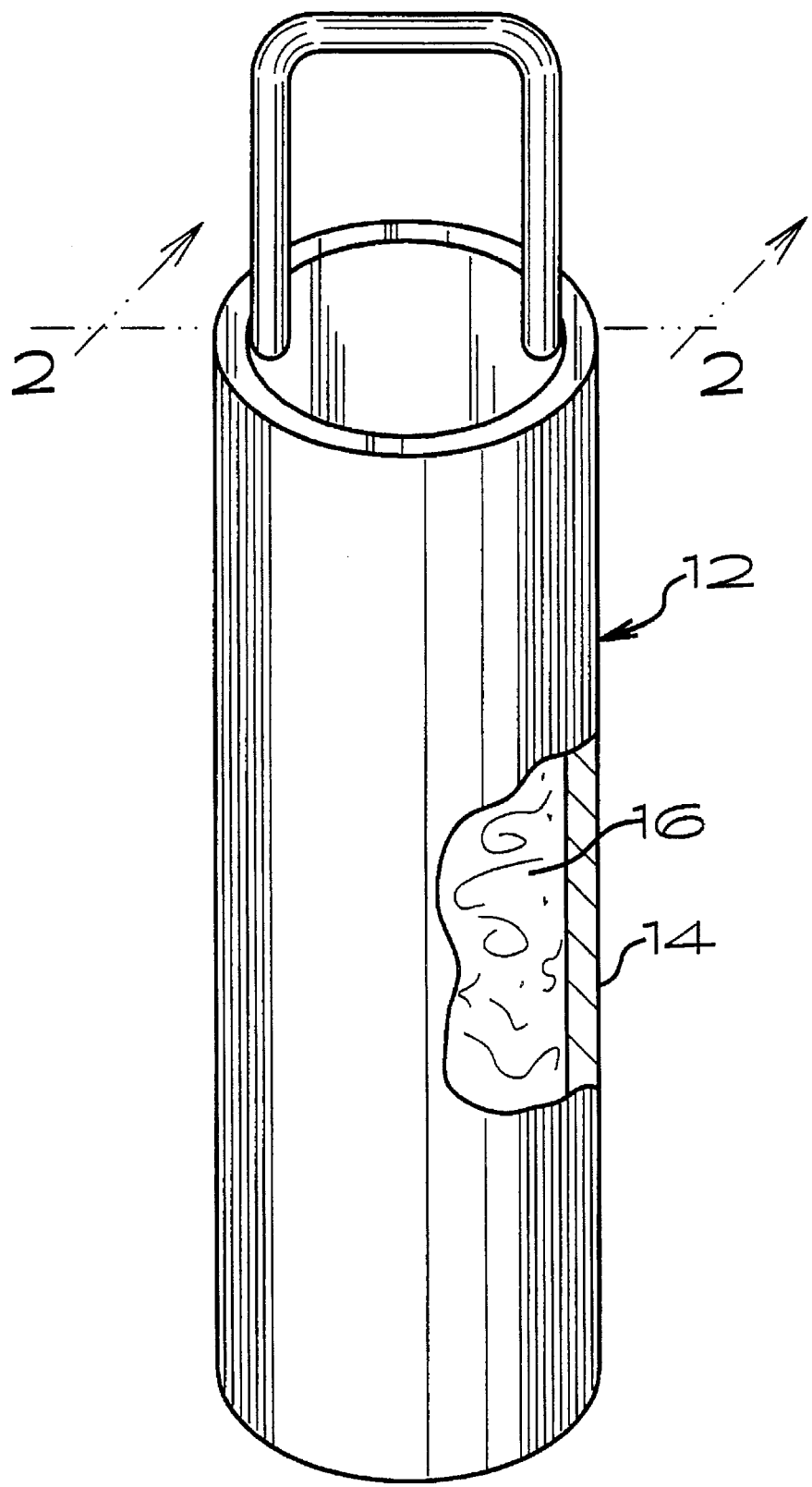
FIG. 1 is a perspective view of one water treatment container of the present invention including selected cut-away portions of a preferred embodiment of the invention.
Figure 2:
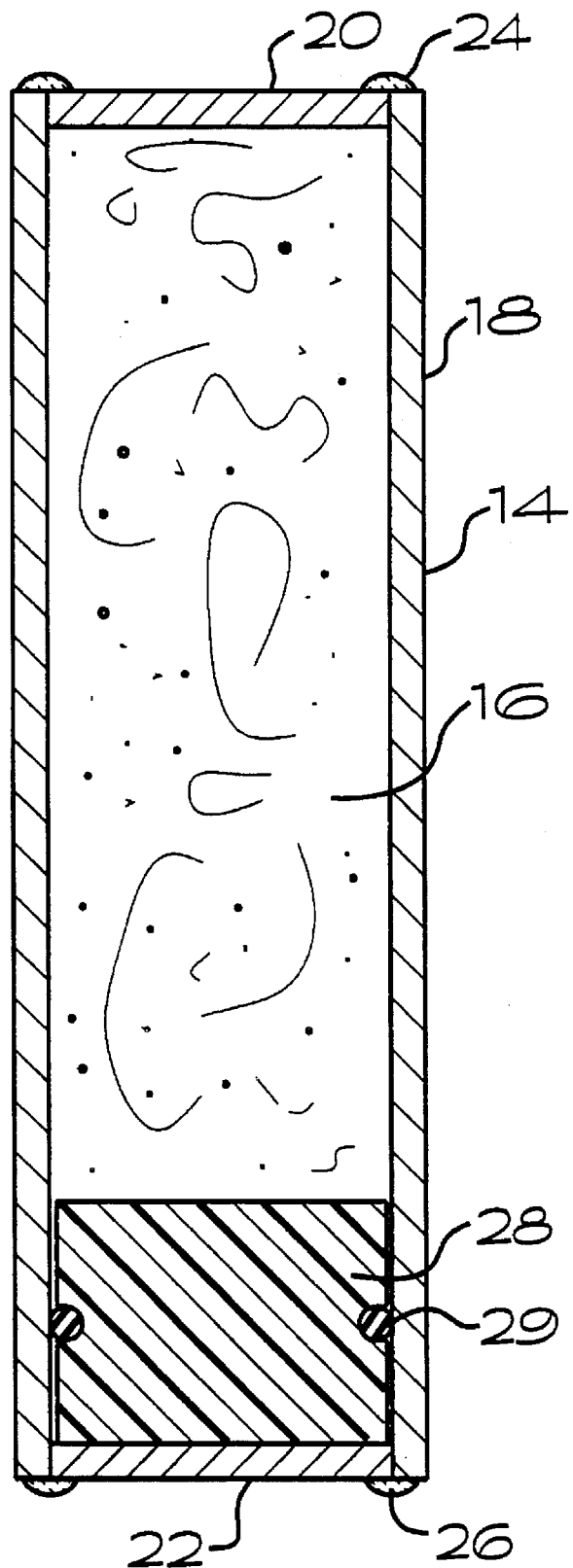
FIG. 2 is a cross-sectional view of FIG. 1 taken along line 2—2.

As best shown in FIG. 2, Container 14 comprises a tubular portion 18 and two end portions 20 and 22, respectively. The end portions 20 and 22 are generally of a separate structure from the tubular portion 18, but generally of the same material, preferably a copper containing material, such as brass or bronze. The end portions 20 and 22 are affixed within the ends of the tubular portion 18 by any known means, such as a zinc-tin or silver solder 24 and 26, respectively, being preferred means for affixing end portions 20, 22 within tubular portion 18.

Also shown in FIG. 2 is an inert solid plug 28, generally a plastic type material and a rubber or polypropylene "O" ring 29, which is disposed between the chemical mixture 16 and the end portion 22.

Acids which have been found useful in the present invention include commonly used organic acids such as acetic acid, ascorbic acid, citric acid, succinic acid, tannic acid, tartaric acid as well as other acids which may be derived from vegetables, fruits and other plant life material.

The mixture may also include an organic solvent which will maintain in solution the selected weak acid. For example, this would include an organic solvent or oil selected from the group consisting of kerosene, petroleum naphtha, turpentine, mineral oil, and "V.M.& P" (Varnish Makers and Painters) naphtha, and the like. Moreover, the oils which are relatively "sticky" or "tacky" provide the means for attaching the magnetite to the inert fillers.

Even further, the chemical mixture may include inert fillers such as cellulosic fibers which have been found useful. It has been found that in the preparation of the chemical mixture 16 in container 14 heat may develop and said heat may be absorbed and dissipated throughout container 14 by the use of inert fillers, such as cellulosic fibers including, but not limited to saw dust, ground wood, and other forms of wood chips, which are preferred. It is also contemplated that other inert materials having a high heat capacity could be utilized as fillers to dissipate any heat formed from an exothermic reaction of the chemical mix and prevent degradation of the chemical components. Moreover, since the magnetite is in a fine powder form, the inert fillers provide the means for the magnetite to be distributed, substantially uniformly throughout the container. Otherwise, the fine powder magnetite has the tendency to settle, and compact in a relatively small space in the container.

In the preparation of a solution treatment chemical mixture, the active ingredients being, for example, magnetite and a weak acid, are generally such that the magnetite will be in a ratio of about (6:1) to (8:1) parts by weight of magnetite to acid; however, up to 30 percent by weight of acid may be used for some applications. The amount of solvent utilized in the present invention is generally that which is just sufficient to maintain the mixture in a moist state; however, the solvent may weigh up to 30 percent by weight in the mixture. Moreover, when a cellulosic fibrous material is utilized in the present invention, the parts by weight of this fiber will generally not exceed 30 percent by weight of the total chemical mixture.

Another benefit of using the treatment device 12 of the present invention in addition to its inhibiting the formation of new scale is its ability to dissolve existing scale. The NALCO Water Handbook on (page 38.8) distinguishes between "scaling" and "fouling", wherein "scaling" is defined as the precipitation of compounds that become insoluble at higher temperatures, and "fouling" is defined as the settling out of suspended solids, the build up of corrosion products, and the growth of microbial masses. There is no single compound that characterizes "scale"; it is often principally calcium carbonate, but it may also include the calcium, magnesium, or sodium bicarbonate, chloride, or sulfate compounds formed from the "primary constituents" as contaminates in water supplies. Silica, too, is particularly objectionable for this reason, because it is difficult to predict the conditions under which it can be kept in solution. Just the settling out of solids can lead to "concentration cell corrosion", causing local etch or pitting of the pipes.

It is believed that the treatment device or cell 12 of the present invention causes dislodging of pre-existing scale by reversing the corrosion reaction and converting iron ions back into metallic iron. This reversal is believed to change the nature of the interface between the walls of a metallic vessel or pipe and the scale, causing the latter to fall off or be dislodged by moving water therethrough. It is also believed that the presence of the cell 12 has an effect on the crystal formation of such salts. Thus, when a cell 12 is placed into a water system having existing scale the scale soon becomes dislodged and is swept away by moving water. This action can be readily seen when the present invention is placed in a closed water circulation system, such as a boiler, in that the water appears to turn coffee colored due to the iron oxide dissolved in the water from the scale deposits.

The treatment device 12 is easy to install and a number of the treatment devices may be placed at various points in a water circulation system in order to achieve optimal results. The number of containers or cells 12 needed to prevent incrustation and corrosion in a water system depends on the size of the cells, the formulation of the ingredients making up the chemical mixture 16 within the cells, the quality of the water, the temperature of the process, and the concentration of minerals and scale producing chemicals in the water. The cells 12 vary in size from a cell a few inches long weighing a few ounces to cells several feet long weighing several pounds.

The treatment device of the present invention is applicable to a variety of processes. The treatment device 12 is submerged into the water upstream of its intended use, such as, for example in a water cooling tower, a steam generator, etc. or other type of system in which the water or water-based solution requires treatment. The treatment device for a water-based solution must be completely submerged in the solution and should not come into contact with any metal such as with the sides or walls of a water containing conduit or vessel. For example, if the installation is to be in a tank, placement of the cells 12 in a neoprene holder will prevent any contact of the cells 12 with a container's wall. The inclusion of the treatment device 12 in the system reduces substantially the build-up, particularly of calcium and magnesium compounds, and also inhibits the corrosion of, particularly, the iron pipes and fittings utilized throughout the water system.

A more comprehensive understanding of the invention can be obtained by considering the following examples. However, it should be understood that the examples are not intended to be unduly limitative of the invention.

EXAMPLE I

The treatment device for a water-based solution of the instant invention is constructed according to the following method for use in a boiler.

A container is manufactured by taking a brass cylinder and folding the lower sides inward to form an internal flange around the periphery of one end of the cylinder. A circular flat brass plate is dropped through the top of the cylinder onto the flange and brazed into place forming an airtight bottom seal.

Sixty (60) pounds of magnetite is ground into a fine powder. The powdered magnetite is thoroughly mixed with thirty (30) pounds of ground cellulose wood pulp and ten (10) pounds of citric acid. The resulting chemical mixture is moist, but not wet.

The mixture is poured into several containers (cells) which are approximately 36 inches in length and weight approximately two (2) pounds each. The containers are then sealed by placing a plastic plug and "O" ring and a brass cap onto the containers and brazing the seam to form an airtight seal.

The optimum number of cells placed in this closed loop system is one cell for every 75 horsepower. The cells are installed in a boiler system at the following installation points: (a) the water feed tank or "deaerator"; (b) the discharge of the boiler feed pump; (c) the water cistern; and (d) the entrance for vapor into the exchange equipment. The cells are lowered into the water until completely submerged and suspended in order that the sides of the cells did not come into contact with any part of the water transfer system.

The water in the system is fed directly to the feed tank or "deaerator". The water containing the dissolved salts and other solids pass across the cells suspended in the water. It has been found that exposure to the cells inhibits crystallization of the minerals upon the surfaces of the boiler and/or the heat exchange equipment, and consequently, also prevents further incrustation. Although some of the minerals still become deposited on the metal surfaces, the deposits are not crystallized and do not result in corrosion to the metal surfaces. The salts tend to fall out of suspension and precipitate as mud which may be periodically removed from the boiler system by purging the system during the first few months the cells are in operation. The water also will appear to be coffee colored due to the dissolving of iron oxides from the encrusted pipes after exposure to the cells; however, the purges eventually remove these impurities suspended in the water and clear water is eventually maintained in the boiler system.

The effects of treating the water with the cells include elimination of the chemical treatment within the interior of the boiler; elimination of incrustation in the boiler and heat exchange equipment; and a reduction in the loss of energy due to the decrease of pressure which had resulted from incrustation in the pipes.

EXAMPLE II

The solution treatment device of this Example is designed for the treatment of water in a cooling tower.

Sixty (60) pounds of magnetite is ground into a fine powder. The powdered magnetite is thoroughly mixed with twenty-five (25) pounds of ground cellulose wood pulp (sawdust), five (5) pounds of turpentine solvent, and ten (10) pounds of citric acid. The resulting chemical mixture is moist, but not wet.

The mixture is poured into several containers (cells) made as set forth in Example I hereinbefore which are approximately 36 inches in length and weigh approximately two (2) pounds each. The containers are then sealed by placing a brass cap onto the containers and brazing the seam to form an airtight seal.

The optimum number of cells placed in this closed loop system is one cell for every 75 horsepower. The cells are installed in a cooling tower at the indoor reservoir to treat the make-up water before the water is pumped to the heat transfer equipment of the process equipment and into the cooling tower which recirculates the water back to the indoor reservoir. The cells are completely submerged and suspended in the water so there is no contact with the sides of the reservoir or any other objects which could interfere with their effectiveness.

The cells prevent the incrustation and corrosion in the refrigeration circuits, progressively eliminate the existing incrustation in the system equipment; reduce the consumption of biocides; and eliminate the need for chemical corrosion and incrustation inhibitors which disperse the mud created by ph controllers.

EXAMPLE III

The following Example was carried out to determine the efficiency of a treatment device of the instant invention in preventing the corrosion of carbon steel and copper in two different environments, one being tap water and the other being a citric acid solution. In carrying out the tests in this example, the treatment device of the instant invention used was 4 inches in length with an outer diameter of 1 inch. The container was constructed of a brass tube with brass ends and the chemical mixture therein was about 60 percent by weight of magnetite, 30 percent by weight of ground cellulose wood pulp and 10 percent by weight of citric acid. At one end was a plastic plug 28 and an "O" ring 29, and the end portion 22 was coated with silver. A second brass container of the same dimensions was utilized in the example but the container was hollow. That is, the chemical mixture of the present invention was not inserted into the container. The second container was the comparison container used for comparing with the treatment device of the present invention.

Test runs were performed to determine the effectiveness of cells of the present invention in protecting steel and copper coupons from corrosion. The two corrosive media used in this example were tap water and citric acid. The quantitative measure of performance was the comparison of the weight changes of the copper and carbon steel coupons (i) after brushing with a soft brush and (ii) "polishing" the coupons with a glass-fiber brush.

The cumulative set of apparatus used consisted of six one-pint glass jars with lids, six metal coupons (two of which were copper and the other four were plain carbon steel 1010), a cell of the present invention, and a hollow brass container as described above.

Each coupon was held in place by inserting a small glass rod through a hole in the coupon and slipping this rod into a small piece of plastic tubing. This enabled the coupons to stand up. The coupon assembly was then placed into a jar. Each cell or container was supported by two plastic "tees", one below and one above the cell. Inside the jar and covered with liquid this arrangement kept the cell or container from moving about.

Two of the jars were filled with tap water, each with a steel coupon therein wherein the steel coupons were placed such that the coupons never touched the cells.

Four of the jars were filled with 3.544 w/o-"weight percent" citric acid in tap water. Water treatment devices or cells of the present invention were placed in two of the jars, one with a steel coupon therein and the other with a copper coupon therein, wherein the coupons again were positioned so they would not touch the cells. Into the other two jars two blank containers were placed, one in a jar with a steel coupon and the other being placed in a jar with a copper coupon. Again, the positioning of the cells and the coupons were such that the coupons never touched the cells.

All six jars were placed inside a "incubator shaker". This machine was used to agitate the samples at a rate of 100 revolutions per minute which caused the table containing the jars to be oscalated twice (right, left, right, and left) each second. A heater control was not used thereby putting the samples at ambient temperature which was observed to be 23° C.

After 70 hours of contact, the jars were opened and the coupons removed wherein the coupons were then allowed to air dry.

Although each coupon was supplied with a pre-weight, each was weighed again on a Metler analytical balance. These weighings took place prior to the assembly of the coupons in their holder. After the 70 hours of exposure to the liquid media, each coupon was weighed "as is" after it air dried. Then each coupon was brushed with a soft brush and weighed again. Finally each coupon was "polished" with a glass-fiber brush (which appeared to return the coupon to near its original state of cleanliness) and the coupon re-weighed. (This procedure was suggested by Section 6 of ASTM G1-88, "Standard Practice For Preparing, Cleaning and Evaluating Corrosion Specimens").

Table I below shows the amount of corrosion that occurred during each of the six tests and the comparisons between the jars with a "blank cell" and those with the water treatment device of a cell of the present invention.

TABLE I

|  | No Cell | Cell of Example IV |
|---|---|---|
| Media: Tap Water |  |  |
| Coupon | 3" L × 1" W-carbon steel | 3" L × 1" W-carbon steel |
| Initial weight | 11.0272 g. | 11.0943 g. |
| final weight (after polishing) | 10.9939 g. | 11.0707 g. |
| weight change | 0.0333 g. | 0.0236 g. |
| % reduction in corrosion |  | 29.56% |
| Media: Citric Acid |  |  |
| Coupon | 3" L × 1" W-carbon steel | 3" L × 1" W-carbon steel |
| Initial weight | 10.9988 g. | 11.0288 g. |
| final weight (after polishing) | 10.8897 g. | 10.9921 g. |
| weight change | 0.1091 g. | 0.0367 g. |
| % reduction in corrosion |  | 66.46% |
| Media: Citric Acid |  |  |
| Coupon | 3" L × 1" W-copper | 3" L × 1" W-copper |
| Initial weight | 13.0954 g. | 13.0761 g. |
| final weight (after polishing) | 13.0695 g. | 13.0704 g. |
| weight change | 0.0259 g. | 0.0057 g. |
| % reduction in corrosion |  | 77.96% |

From the review of the data shown in Table I, it is clear that the selected liquids treated by a treatment device of the present invention substantially reduces corrosion to carbon steel and copper.

EXAMPLE IV

This Example was run to determine the product improvement (organoleptic evaluation) with different types of alcoholic beverages when exposed to a cell of the present invention. In this Example, two different treating cells were used. Both cells were similar to the one used in Example III, except one was completely silver plated and the other was shrink wrapped with three layers of plastic film. The test solution was a Sutter Home (1991) Soleo wine (11% alcohol by volume). In this test, a bottle of Soleo wine was opened and poured into two 300 ml. Erlenmeyer flasks. A treating cell was placed in each flask and the flasks were sealed with glass stoppers. The cells were left in the flasks for a total of 30 hours at a temperature of 70° F.

In each of the flasks it was noted that within 10 hours there was a noticeable build-up of sulfites on the walls of the cell and this continued at about the same rate on each of the cells, whether the silver coated cell or the brass cell wrapped in plastic, for the remaining period of the test. At the end of the 30 hours each of the bottles were opened and the cells were removed with a substantial portion of sulfites being observed on the cells.

From this example it is clear that the treating cell of the present invention is effective in removing sulfite ions from wine.

EXAMPLE V

This Example was run to determine the product improvement in milk when exposed to a treating cell of the present invention. Comparison was made between different formulations of the present invention.

Into seven glass beakers was poured 55 ml of whole milk having a total fat content of 8 gm/8 oz. The beakers with the milk were left to set out at ambient or approximately 70° F. for a period of three days and during each 24 hour interval, the pH of each beaker of milk was made and the appearance of odors and separating characteristics (curdling) of the milk was observed and noted. In beakers identified by numbers 1–7 in Table II below, the treatment device was a metal container 4" in length with an outer diameter of 1". The metal container was constructed of brass and included a plastic plug identified by the numeral 28 as shown in FIG. 2 and an "O"-ring identified by the numeral 29 in one end thereof. Inside the container was a preselected amount of at least one preselected compound of the present invention with the exception of the metal container in beaker 6 which was empty.

In the treatment of the milk in the beakers 1–7, the container was placed in the milk for a period of 15 seconds at the start of the test. At the start of the test, the pH of the milk was 6.7 and the temperature was 50° F.

TABLE II

| Allotropic Cell and Ingredient Composition | After 24 Hours | | After 48 Hours | | After 72 Hours | |
|---|---|---|---|---|---|---|
| Initial pH 6.7 at 10 C. | pH, 20 C | Appearance | pH, 20 C. | Appearance | pH, 20 C. | Appearance |
| 1. Metal container Magnetite (45 g.) | 6.45 | Normal appearance with little odors noticed | 6.38 | Cloudy, much residue, curdling, ring around glass is present but not stable when glass is shaken | 6.35 | Loose curdling with separation. Sour smell |

TABLE II-continued

| Allotropic Cell and Ingredient Composition | After 24 Hours | | After 48 Hours | | After 72 Hours | |
|---|---|---|---|---|---|---|
| Initial pH 6.7 at 10 C. | pH, 20 C | Appearance | pH, 20 C | Appearance | pH, 20 C | Appearance |
| 2. Metal container Magnetite (40 g.) Turpentine (oil) (5 g.) | 6.45 | Normal appearance with little odor noticed | 6.4 | Cloudy with some residue present, curdling, ring around glass after shaking | 6.4 | Large curdling, but still milky in appearance Less sour than #1 |
| 3. Metal container Magnetite (40 g.) Citric (acid) (5 g.) | 6.46 | Normal appearance with little odor noticed | 6.4 | Cloudy with some residue, curdling, heavy stable ring around glass | 6.35 | Smaller curds, milky and less sour than #1 |
| 4. Metal container Magnetite (30 g.) Citric (acid) (5 g.) Fine wood chips (filler (5 g.) Turpentine (oil) (5 g.)) | 6.50 | Normal appearance with no foul odor noticed - still sweet | 6.48 | Less cloudy, residue present but lessened amount, little curdling, ring disappears as glass is shaken | 6.4 | Small curdling, milky, little souring smell, sweeter and cleaner. |
| 5. Metal container- Magnetite (40 g.) Fine wood chips filler (5 g.) | 6.48 | Normal appearance with little odor noticed | 6.41 | Little clouding, residue present but forms streams between ring and milk as glass is turned on its sides. Ring not stable. | 6.35 | Large curdling, flat light sour smell - lacks sweetness |
| 6. Metal container | 6.45 | Normal appearance with little odor noticed | 6.4 | Heavy clouding, much residue and curdling, some of ring is removed by shaking glass | 5.84 | Large curdling |
| 7. Control-Not treated | 6.45 | Normal appearance with little odor noticed | 6.4 | Heavy clouding, much residue and curdling, some of ring is removed by shaking glass | 6.1 | Sour milk smell, curdled and separated |

It was noted that during the test, when the pH reached 6,4 a noticeable separation (curdling) of the butter fat from the milk was observed. By the time the pH had reached 6.35 a "sour" milk odor developed. It is seen from the tests that the beakers or runs identified by the numeral 4 and 5 in TABLE II retained sweetness and exhibited less curdling than that which occurred in the remaining beakers. Also, beakers or runs 1, 2, 3 and 5 were much slower to curdle or sour than beakers 6 and 7 which were not treated with a container containing magnetite. Thus, it is clear that the milk treated by a treating cell containing magnetite, an acid, an inert filler, and an oil was the superior treating cell, but those cells containing at least magnetite therein were also effective for reducing the "souring" of milk.

It is realized that the foregoing is only for explanation purposes and it is also realized that other applications may be made within the scope and spirit of the present invention without limitations to the claims appended hereto.

What is claimed is:

1. A device for the treatment of a solution comprising:
   a sealed container; and
   a chemical treatment mixture disposed within said container, said mixture comprising at least magnetite and a weak acid.

2. The device of claim 1 wherein said weak acid is selected from the group consisting of acetic acid, ascorbic acid, citric acid, succinic acid, tannic acid, tartaric acid, and mixtures thereof.

3. The device of claim 1 wherein the ratio of said magnetite to said weak acid is in the range of about 8:1 to 6:1 parts by weight.

4. The device of claim 1 wherein said mixture includes a solvent.

5. The device of claim 1 said mixture including a solvent which is a petroleum base organic solvent selected from the group consisting of kerosene, mineral oil, petroleum naphtha, turpentine, V.M.&P naphtha and mixtures thereof.

6. The device of claim 1 wherein said mixture includes an inert filler.

7. The device of claim 6 wherein said inert filler is a cellulosic fibrous material.

8. The device of claim 6 wherein said inert filler is a ground wood.

9. The device of claim 1, said container comprising a tubular portion and two end portions, a solid plastic plug being in one end portion.

10. The device of claim 1, said sealed container being a metallic material.

11. The device of claim 10 wherein said metallic material is selected from the group consisting of copper, aluminum, zinc, tin, and alloys thereof.

12. The device of claim 1 wherein said mixture contains from about 60 to 80 parts by weight of said magnetite, from about 10 to 30 parts by weight of said weak acid, and up to 30 parts by weight of an inert filler.

13. The device of claim 1 wherein said mixture contains about 60 parts by weight said magnetite compound, about 10 parts by weight of said weak acid, about 25 parts by weight of an inert filler, and about 5 parts by weight of a solvent.

14. The device of claim 1, said sealed container being constructed of two dissimilar metals.

15. In combination with a solution to be treated a device for treating said solution comprising:

a sealed container; and a chemical treatment mixture disposed within said container, said mixture comprising at least magnetite and a weak acid.

16. The device of claim 15 wherein said weak acid is selected from the group consisting of acetic acid, ascorbic acid, citric acid, succinic acid, tannic acid, tartaric acid, and mixtures thereof.

17. The device of claim 15 wherein the ratio of said magnetite to said weak acid is in the range of about 8:1 to 6:1 parts by weight.

18. The device of claim 15 wherein said mixture includes a solvent.

* * * * *